H. T. THOMAS.
SPRING SHACKLE.
APPLICATION FILED AUG. 16, 1919.
1,413,635.
Patented Apr. 25, 1922.
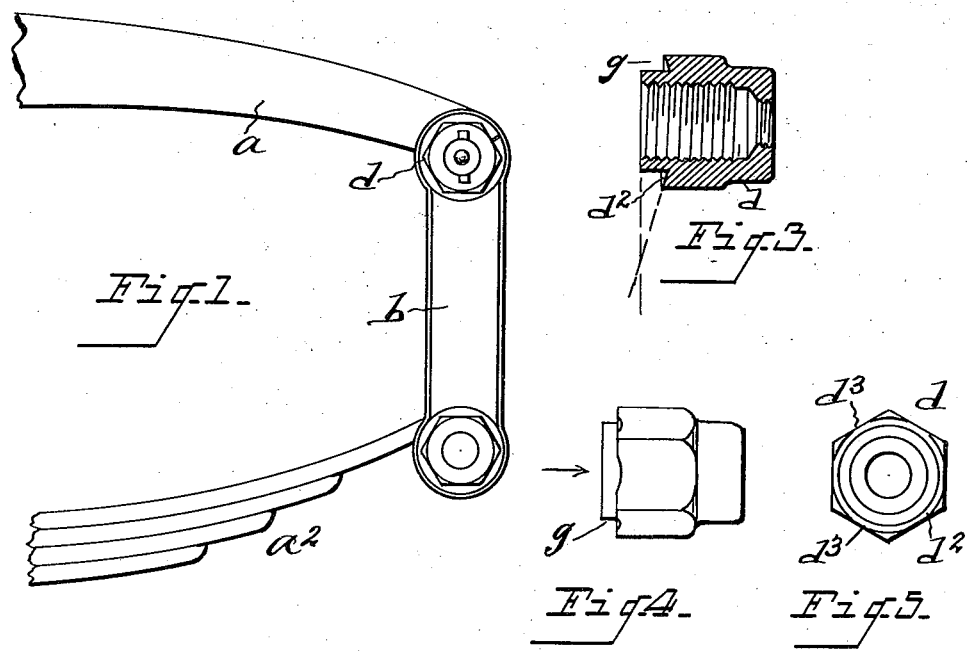
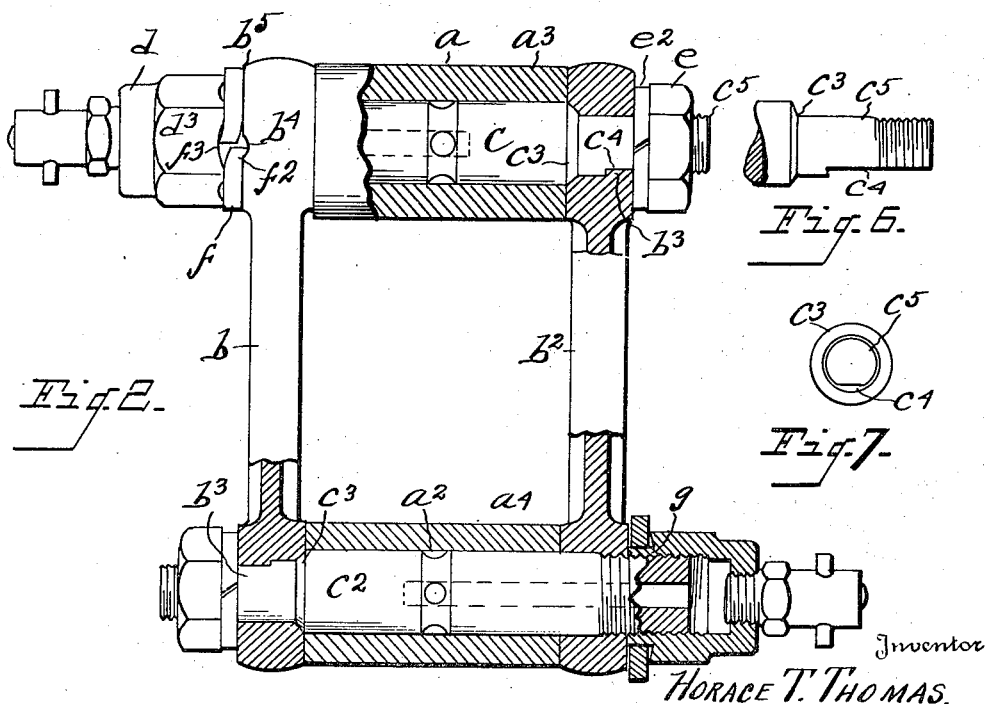
Inventor
HORACE T. THOMAS.
By Ralzemond A. Parker
Attorney

UNITED STATES PATENT OFFICE.

HORACE T. THOMAS, OF LANSING, MICHIGAN.

SPRING SHACKLE.

1,413,635.   Specification of Letters Patent.   Patented Apr. 25, 1922.

Application filed August 16, 1919. Serial No. 318,050.

*To all whom it may concern:*

Be it known that I, HORACE T. THOMAS, a citizen of the United States, residing at Lansing, county of Ingham, State of Michigan, have invented a certain new and useful Improvement in Spring Shackles, and declare the following to be a full, clear, and exact description of the same, such as will enable others skilled in the art to which it pertains to make and use the same, reference being had to the accompanying drawings, which form a part of this specification.

My invention relates to spring shackles for automobiles and the object of my improvements is to provide a construction facilitating adjustment and in which there shall be no lost motion or liability to become loose in practice.

I secure this object in the device illustrated in the accompanying drawings, in which:

Figure 1 is an elevation showing a construction embodying my invention with so much of the automobile as is necessary to show its connection therewith.

Figure 2 is an elevation looking from the right of Fig. 1, parts being in section.

Figure 3 is a sectional view of the cap nut.

Figure 4 is a side elevation, and

Figure 5 is an elevation looking from the left of Fig. 4, showing the cap nut.

Figure 6 is a detail view of one end of the shackle bolt.

Figure 7 is an elevation looking from the right of Fig. 6.

$a$ is a hanger and $a^2$ a spring of an automobile. $b$ and $b^2$ are links pivoted at the ends of the hanger $a$ and spring $a^2$. $a^3$ and $a^4$ are transversely apertured cylindrical sleeves formed at the end respectively of hanger $a$ and the spring $a^2$. $c$ and $c^2$ are shackle bolts passing through, respectively, the sleeves $a^3$ and $a^4$ and having their ends extending from the ends of said sleeves. $b$ and $b^2$ are similar links having eyes at their ends passing over the ends of the bolts $c$ $c^2$, their inner faces engaging against the finished end faces of the sleeves $a^3$ and $a^4$. The shackle bolts $c$ and $c^2$ are provided with conical-surfaced shoulders $c^3$ toward one end, beyond which said bolts extend with a diminished diameter. The wall of the aperture through one eye of each of the links $b$, $b^2$ is squared at $b^3$ and the end of the bolt is milled away as shown at $c^4$, Figs. 5 and 7, to engage this squared portion of the aperture wall to prevent the shackle bolt from turning about its axis. The other end of each of the shackle bolts is screw threaded and there is an octagonal screw or nut cap $d$ which engages as a nut upon the screw threads of the bolt to secure the same in place. There is a nut $e$ and washer $e^2$ upon the contracted end of the shackle bolt which holds the same firmly in connection with the shoulders $c^3$. $b^4$ is a slot in the outer face $b^5$ of one of the eyes of a link $b$ or $b^2$. This is formed radially and extends between the aperture to the periphery of the eye.

The screw-cap $d$ is provided with a concentric annular projection $g$ of a little greater length than the thickness of the washer $f$.

The screw-cap $d$ is turned out to form a conical surface concentric therewith around the projection $g$ at its inner end, the wall of said surface being concave inward. The conical turning of the end of the screw-cap is continued until it extends to the octagonal edges of the walls of the cap and cuts them away intermediate the ends for a distance as indicated at $d^3$, $d^3$, so as to form concavities in the end and edges.

$f$ is a spring-ring washer having its ends turned outward to form somewhat sharp, projecting edges $f^2$ and $f^3$. Said washer is placed over the shackle bolt and the screw-cap screwed up against it, thus developing the resilience of the washer and holding the parts firmly in place. When the screw-cap is sufficiently tight one of the turned-up edges $f^2$ of the washer engages in the slot $b^4$ and the other of said turned-up edges engages in one of the concavities $d^3$ in the face of the screw-cap $d$.

In adjusting the parts the screw-cap $d$ is set up until the inner end of the projection $g$ engages the surface $b^5$. The cap is then turned backward until it is locked by the engagement of an end of the washer in a concavity $b^4$. This secures the proper tension on the parts.

Claims:

1. The combination of a bolt, a nut upon said bolt, said bolt engaging in a screw threaded aperture, a spring washer interposed between said nut and the surface around said aperture, and pressing against the inner surface of said nut in a direction axial to said bolt and a salient portion of said washer engaging the inner surface of said nut, said nut having a projection extending through the aperture of said washer and adapted to engage the surface around said aperture, said nut being provided with indentation arranged at an angular position and adapted to be engaged by the salient portion of said washer whereby said nut may be turned up to a definite position until stopped by contact with the surface surrounding said aperture and then turned backward to be automatically locked by said salient portion of the washer engaging an indentation in the inner surface of said nut.

2. In a construction of the kind described, a part having an aperture therethrough having cylindrical walls for a portion of its length and being squared for the remainder of its length, a bolt milled off from its end fitting into the cylindrical portion of said aperture and the milled off portion of the bolt fitting against the squared portion of said aperture and extending beyond the same and provided with screw threads on its extended end, the shoulder formed by milling off a portion of said bolt engaging the inner surface of the squared portion of said aperture, and a nut engaging the screw threaded portion of said bolt to hold the shoulder formed by the milled off portion of said bolt against the inner end of the squared portion of said aperture.

3. The combination of the devices of claims 1 and 2 when forming the securing means for the bolt at one end of a spring shackle.

In testimony whereof, I sign this specification.

HORACE T. THOMAS.